(12) United States Patent
Pan et al.

(10) Patent No.: US 7,995,264 B2
(45) Date of Patent: Aug. 9, 2011

(54) SYSTEM AND METHOD FOR ACTUATION OF SPATIAL LIGHT MODULATORS

(75) Inventors: Kun Cindy Pan, Allen, TX (US); Paul Lawrence Rancuret, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 87 days.

(21) Appl. No.: 12/363,453

(22) Filed: Jan. 30, 2009

(65) Prior Publication Data

US 2010/0195189 A1    Aug. 5, 2010

(51) Int. Cl.
*G02B 26/00* (2006.01)
*G02B 26/08* (2006.01)

(52) U.S. Cl. ..................... 359/290; 359/223.1
(58) Field of Classification Search .............. 359/198.1, 359/212.1, 223.1, 224.1, 224.2, 290, 291, 359/298, 315, 316
See application file for complete search history.

(56) References Cited

U.S. PATENT DOCUMENTS

| | | | |
|---|---|---|---|
| 5,706,123 A * | 1/1998 | Miller et al. | 359/291 |
| 7,019,883 B2 * | 3/2006 | Moon et al. | 359/290 |
| 7,515,324 B2 * | 4/2009 | Hui | 359/237 |
| 2002/0176151 A1 | 11/2002 | Moon et al. | |
| 2003/0223084 A1 | 12/2003 | Mehrl et al. | |
| 2006/0007546 A1 | 1/2006 | Lee et al. | |

* cited by examiner

*Primary Examiner* — William C Choi
(74) *Attorney, Agent, or Firm* — Charles A. Brill; Wade James Brady, III; Frederick J. Telecky, Jr.

(57) ABSTRACT

A system comprises a spatial light modulator comprising a plurality of modulation elements, the spatial light modulator operable to receive an optical signal comprising one or more optical channels, wherein the elements are operable to perform an optical function on at least one of the one or more optical channels. The system further comprises two or more reset groups associated with the spatial light modulator, wherein each reset group comprises one or more elements, and wherein at least one of the one or more optical channels resides on at least two of the two or more reset groups. The system also comprises a controller operable to actuate the elements of at least one of the at least two reset groups associated with the optical channel at a different time than any one or more other reset group of the at least two reset groups.

25 Claims, 4 Drawing Sheets

SYSTEM AND METHOD FOR ACTUATION OF SPATIAL LIGHT MODULATORS

TECHNICAL FIELD

This disclosure relates in general to control of spatial light modulators, and more particularly to a method and system for using multiple reset groups on a spatial light modulator.

OVERVIEW

A spatial light modulator comprises a plurality of modulation elements that can each be actuated in order to modulate an optical signal. In some embodiments, modulation comprises one or more of amplitude modulation, phase modulation, polarization modulation, and/or frequency modulation. Spatial light modulators may be used in a variety of applications such as projection systems, optical networking applications, or spectrographic applications. In some embodiments, a spatial light modulator can be used to perform switching, attenuation, or filtering functions on optical channels contained in an optical signal. In some embodiments, a spatial light modulator comprises a plurality of reflective mirror elements, further organized into reset groups, wherein each reset group comprises one or more mirror elements, and wherein the mirror elements contained within a reset group can be actuated simultaneously. In existing systems, the reset groups are coupled together so that they can be reset at the same time. In addition, in existing systems each optical signal in the optical channel is modulated by a single reset group of elements. In this configuration, every reset actuation has the potential of affecting every optical channel, thus creating the opportunity for undesirable signal modulation, such as insertion loss.

SUMMARY OF EXAMPLE EMBODIMENTS

In accordance with one embodiment of the present disclosure, a system comprises a spatial light modulator comprising a plurality of modulation elements, the spatial light modulator operable to receive an optical signal comprising one or more optical channels, wherein the elements are operable to perform an optical function on at least one of the one or more optical channels. The system further comprises two or more reset groups associated with the spatial light modulator, wherein each reset group comprises one or more elements, and wherein at least one of the one or more optical channels resides on at least two of the two or more reset groups. The system also comprises a controller operable to actuate the elements of at least one of the at least two reset groups associated with the optical channel at a different time than any one or more other reset group of the at least two reset groups.

In accordance with another embodiment of the present disclosure, a method comprises receiving one or more optical channels comprising collimated temporally coherent light at a spatial light modulator, the spatial light modulator operable to receive and transmit data. The method also comprises performing one or more optical functions on one of the one or more optical channels with a plurality of modulation elements on the spatial light modulator. The method further comprises actuating a first reset group and a second reset group of the plurality of modulation elements associated with the optical channel, and wherein the first reset group and the second reset group are actuated at different times.

Numerous technical advantages are provided according to various embodiments of the present disclosure. Particular embodiments of the disclosure may exhibit none, some, or all of the following advantages depending on the implementation. In certain embodiments, variation in optical insertion loss during optical signal reconfiguration may be reduced. In other embodiments, complete signal loss during optical signal reconfiguration may be avoided.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION

In some applications, an optical signal can comprise a number of optical channels. The optical signal may comprise collimated, temporally coherent light. A spatial light modulator comprising a plurality of elements may be used to attenuate or filter the optical channels by directing one portion of the light to one direction and another portion of the light to another direction. The elements may comprise micromirrors, or other suitable modulating elements in any of the specific embodiments. A controller may be used to drive the elements to the desired state. When an optical signal reconfiguration occurs, the individual elements might be transitioned to a different state or kept in the same state. Even when kept in the same state, some variation of the element attributes could occur and this disruption can cause a change in the optical transfer function greater than an acceptable threshold. The element attribute variation could even lead to an optical signal insertion loss. In embodiments of the present disclosure, an optical channel can be spread across two or more reset groups and the reset groups can be actuated at different times, thus reducing the disruption to the optical signal and reducing change in insertion loss.

Figure 1A:
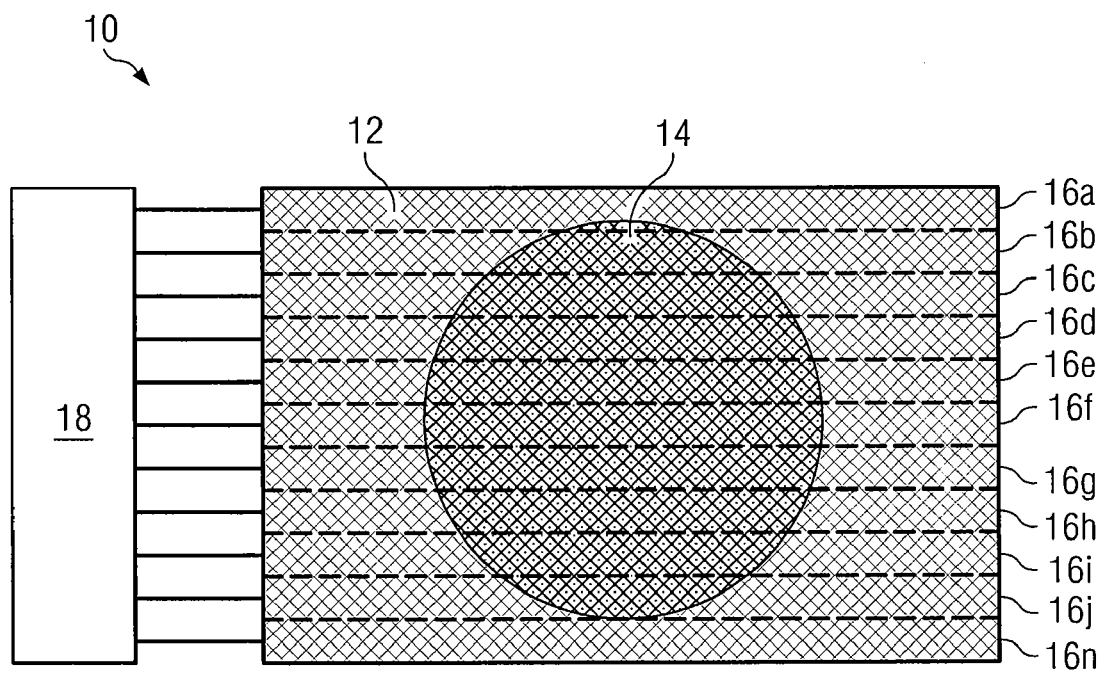
FIG. 1A illustrates an example embodiment of a spatial light modulator with a plurality of reset groups.

FIG. 1A illustrates one example embodiment of a spatial light modulator 10 with a plurality of reset groups 16. FIG. 1A comprises spatial light modulator 10, micromirrors 12, optical channel 14, and reset groups 16a-16n. In this embodiment and in other embodiments described in this disclosure, the elements of the spatial light modulator comprise micromirrors. In other embodiments, the elements could comprise any other suitable modulating element. Spatial light modulator 10 comprises a plurality of micromirrors 12 arranged in a two-dimensional array on spatial light modulator 10. Each micromirror 12 may be used with two working states, each state corresponding to a different tilt angle of the micromirror 12. Input light from an optical network (an optical signal) may comprise one or more optical channels 14 that are projected onto spatial light modulator 10. One optical channel 14 is shown in FIG. 1A, although a spatial light modulator 10 may process any suitable number of optical channels 14 from one or more optical signals. Optical channel 14 in this example has a circular cross-section spread over a number of micromirrors 12. Other optical channels may be spread across the spatial light modulator 10, and the other optical channels may or may not overlap optical channel 14. In this embodiment, the optical signal comprises collimated, temporally coherent light. In other embodiments, the optical signal could comprise just collimated light or just temporally coherent light, or just spatially coherent light.

Micromirrors 12 on spatial light modulator 10 may be used to perform one or more optical functions on optical channel 14. An optical communications network may comprise any number of optical fibers for communicating data. An optical signal from an input fiber may be attenuated or filtered by directing a portion of the light to one direction and a portion of the light to another direction. As an example, some or all of the light may be directed into a receiving fiber.

A controller 18 for the spatial light modulator 10 may be used to create a control signal to drive each of the micromirrors 12 to a desired state during an optical signal reconfiguration. Controller 18 may be used to actuate one or more micromirrors. Actuation can comprise loading a memory cell associated with one or more micromirrors with a desired value. Actuation may also comprise applying one or more reset pulses to one or more micromirrors to drive the micromirrors to a desired state as dictated by the contents of an associated memory cell, or as dictated by some other suitable means. Actuation may also comprise loading one or more memory cells and applying one or more reset pulses in any order or combination. During some resets, each micromirror 12 could be redirected to a different tilt angle state (a "crossover transition") or kept in the same tilt angle state (a "same-side transition") with the application of a reset pulse. During this optical signal reconfiguration, micromirrors 12 that undergo a same-side transition may experience a slight tilt angle perturbation and be momentarily deflected from their designated position by the control signal. In some embodiments, for example, the micromirrors 12 undergoing a same side transition may be set at an angle X° and then shift through an angle X±Y° for a short time during the transition. After the transition, the micromirrors 12 will return to the desired angle of X°. The values of the angles X and Y can comprise any suitable value. This disruption in the angle could guide a part of the optical signal away from a receiving port, where a port may be a fiber, which can result in an unwanted optical signal modulation (such as an amplitude change or an insertion loss change).

In some embodiments, multiple reset groups 16 of the micromirrors 12 may be used to reduce undesired changes to the optical insertion loss. FIG. 1A illustrates a plurality of reset groups 16a-16n that may be used to reduce the change in optical insertion loss. Instead of resetting each micromirror 12 associated with an optical channel 14 at the same time, the micromirrors 12 may be divided into a plurality of reset groups 16, and the reset groups 16 can be reset at two or more different times (with controller 18 or any suitable controller). Resetting refers to driving the micromirrors to a desired tilt angle state. This leads to a tilt angle disruption of only a portion of the micromirrors 12 associated with an optical channel 14 during a reset, as opposed to the disruption of all of the micromirrors 12 that could occur if all of the micromirrors 12 are reset at the same time. Only the micromirrors 12 that are part of the reset group 16 being reset are disturbed (a partial disruption). When the micromirrors 12 of one or more particular reset groups 16 are being reset, the micromirrors 12 associated with all other reset groups 16 are not substantially disturbed. A partial disruption of the optical signal may reduce the amount of unwanted optical signal modulation that occurs at a given time.

FIG. 1A also illustrates reset groups 16a-16n of spatial light modulator 10. In this example, ten reset groups 16 associated with optical channel 14 are shown, but a greater or lesser number of reset groups 16 may be used in other embodiments. In some embodiments, the number of reset groups 16 may range from 1 to N, where N is the total number of modulation elements contained within the spatial light modulator. A reset group may contain any number of modulation elements from 1 to N. Any two or more reset groups may or may not contain the same number of elements. In addition, the spatial distance between any two or more modulation elements residing in the same reset group can range from 0 (i.e., the elements are adjacent) to K, where K is the maximum distance between any two elements on the spatial light modulator.

The reset groups 16 can be reset at times different from one another. During a reset, some of the micromirrors 12 may be disturbed and produce a change in optical insertion loss. As one example, optical channel 14 can be distributed across ten reset groups 16 so that during any given reset only a relatively small portion of optical channel 14 is disturbed. In some embodiments, each of the ten reset groups 16 can be reset at a time different from each of the other reset groups 16. A control signal, such as a signal from controller 18, may be used to reset the reset groups 16 in any suitable order. In other embodiments, two or more of the reset groups may be tied together so that a control signal will reset the groups at the same time. For example, it may be desirable to use a system as illustrated in FIG. 1A but with five reset groups 16 instead of ten. In that case, some of the reset groups 16 could be tied together so that they are reset at the same time. Reset group 16a may be tied to 16b, 16c to 16d, 16e to 16f, etc., so that optical channel 14 is reset in five groups instead of 10. Any suitable combination of reset groups may be used. Also, in some embodiments two or more reset groups may be reset at the same time without tying the respective control signals together.

In FIG. 1A and in other figures, an embodiment of the present disclosure is described in an optical networking application. However, other embodiments may be used in other applications outside of optical networking, such as spectrographic systems.

Figure 1B:
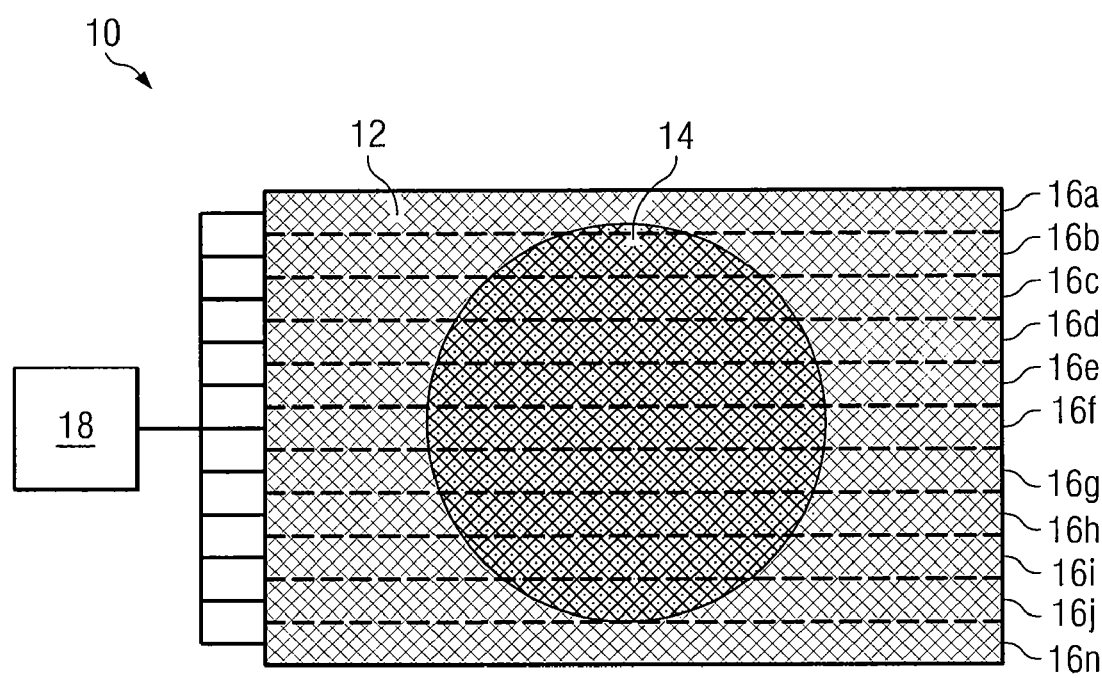
FIG. 1B illustrates an example embodiment of a spatial light modulator with a plurality of reset groups tied together.

FIG. 1B illustrates an example embodiment of a spatial light modulator with all reset groups 16 tied together. In FIGS. 1A and 1B, like numbers refer to like components. In FIG. 1B, a control signal from controller 18 used to reset the micromirrors 12 can reset each micromirror 12 on spatial light modulator 10 at the same time because all of the reset groups are tied together. In this case, the change in optical insertion loss experienced by the optical signal could be greater during this reset than if the reset groups 16 were reset at different times.

Figure 2:
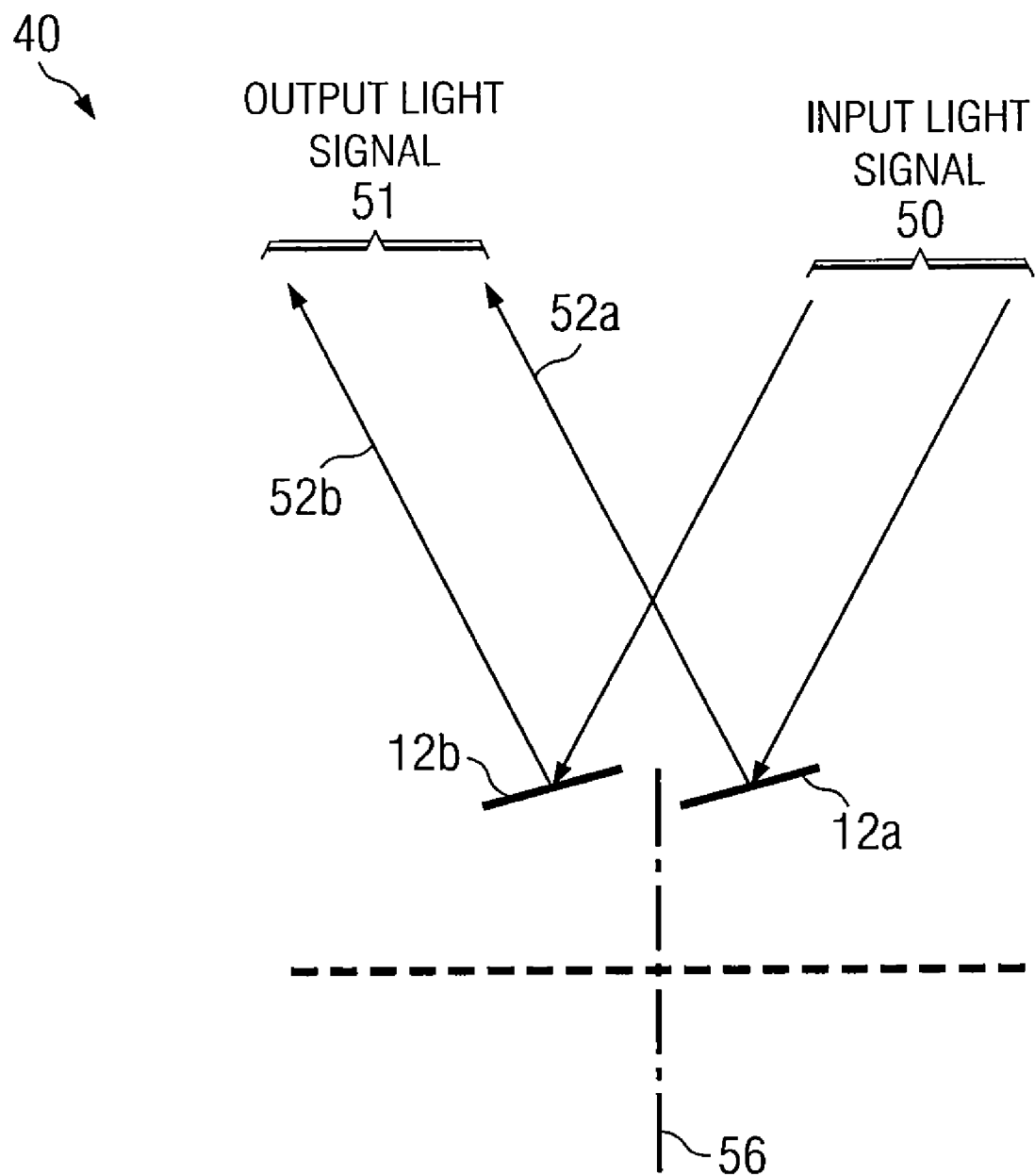
FIG. 2 illustrates an example fiber optic communication system.

FIG. 2 illustrates a portion of an example fiber optic communication system 40. System 40 comprises a plurality of micromirrors 12, and one or more reset boundaries 56. System 40 may also comprise any suitable number of input light signals 50 and any suitable number of output light signals 51. In this embodiment, the input light signal 50 is coupled to the spatial light modulator 10 from an optical fiber, and the output light signal 51 is coupled from the spatial light modulator 10 into an optical fiber. Other embodiments of coupling input light signal 50 and the output light signal 51 to and from the spatial light modulator 10 are possible. Light 50 may comprise a signal traversing the communication system and traveling through an input fiber to one or more micromirrors 12 on a spatial light modulator. Micromirrors 12a and 12b are illustrated here, although any suitable number of micromirrors may be used. Micromirrors 12a and 12b may each comprise any suitable modulating element of a spatial light modulator. Light 50 may be reflected by micromirrors 12a and 12b, along paths 52a and 52b. One or more of the micromirrors may perform one or more optical functions on light 50. The micromirrors 12 may be used to attenuate or filter the optical signal, for example.

Reset boundaries 56 are also illustrated in FIG. 2. As one example, reset boundary 56 may separate micromirror 12a (and other micromirrors not shown) from micromirror 12b (and other micromirrors not shown) so that micromirrors 12a and 12b are reset at different times. When a reset occurs, the micromirrors 12 of the group or groups being reset may be redirected to a different tilt angle deflection state or may be kept in the same tilt angle deflection state. When kept in the same tilt angle deflection state, the micromirrors 12 may be slightly disturbed during the reset and this disturbance could cause light 51 to be deflected away from its intended destination, such as a particular optical fiber. This can result in the loss of signal fidelity and therefore a loss of information being transmitted by the signal.

As an example, in some applications one or more reset groups may be reset at the same time. During the reset, the time it takes for one or more elements to achieve the final state may be greater than an optical signal clock, which could introduce unrepairable error in the signal. In some applications, a reset could cause all or part of a signal to experience a change in amplitude. This change could be greater than an acceptable performance threshold, and it could last for longer than an acceptable amount of time. In addition, for a portion of time a receiver may receive approximately zero signal. Resetting the elements using reset groups that are reset at different times can reduce this type of error in the optical signal. During a reset, only a portion of the elements are reset and those not being reset can provide stability in the signal.

When a reset of the micromirrors 12 occurs in FIG. 2, micromirrors 12 that reside in different reset groups may be reset at different times. For example, micromirror 12a can be reset at a different time than micromirror 12b. In certain instances, this may reduce the optical insertion loss of the signal. The micromirrors 12 that reside on a reset group that does not undergo a transition may not be substantially disturbed during the transition of one or more of the other reset groups. Thus, at least a part of the signal can remain stable during a reset and reduce the optical insertion loss occurring during the reset.

Figure 3:
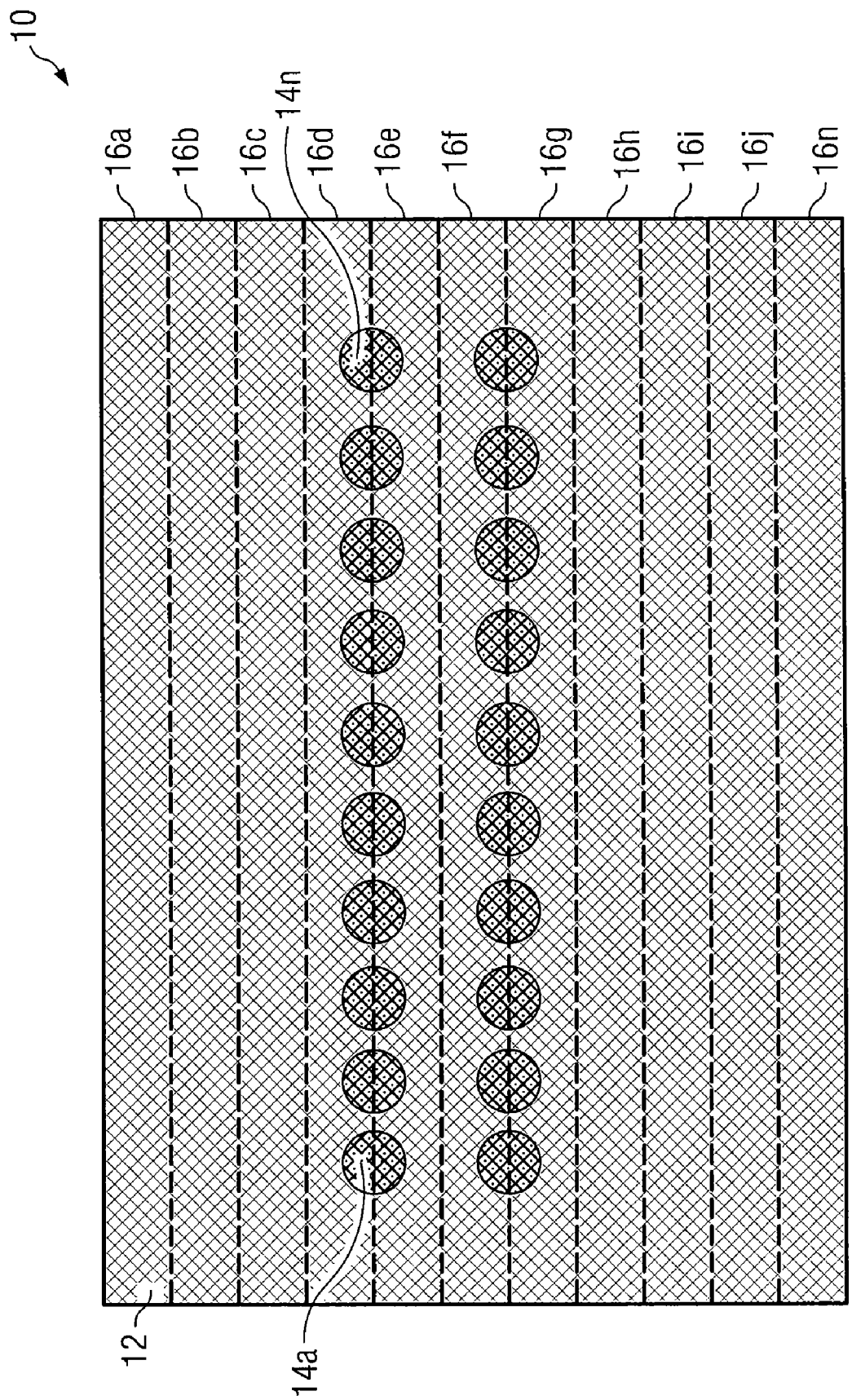
FIG. 3 illustrates another example embodiment of a spatial light modulator with a plurality of reset groups.

FIG. 3 illustrates another example embodiment of a spatial light modulator 10 with a plurality of reset groups 16. FIG. 3 comprises spatial light modulator 10, micromirrors 12, optical channels 14a-14n, and reset groups 16a-16n. Spatial light modulator 10 comprises a plurality of micromirrors 12 arranged in an array on spatial light modulator 10. In this embodiment, optical channels 14a-14n each comprise an array of micromirrors. In this example, 20 optical channels 14 are illustrated, but any suitable number of optical channels may be used. Further, any spatial configuration of optical channels 14 on the spatial light modulator 10 may be used. Spatial light modulator 10 further comprises reset groups 16a-16n, with dashed lines between the reset groups representing the reset boundaries. Reset groups 16 can each comprise any suitable number of micromirrors 12, in any suitable layout, configuration, or partitioning of the spatial light modulator 10. In other embodiments, the reset groups 16 may be oriented vertically, or at any other suitable angle, and the micromirrors 12 constituting a reset group 16 may form a contiguous layout, or may be dispersed discontinuously or spatially dithered. In this example embodiment, each optical channel 14 resides on two reset groups 16. In addition, some of the reset groups 16 comprise multiple optical channels 14. When one of these reset groups 16 is reset, the micromirrors 12 associated with the reset group 16 are reset for a plurality of optical channels 14. In other embodiments, a reset group 16 may be associated with any number of optical channels 14.

Figure 4:
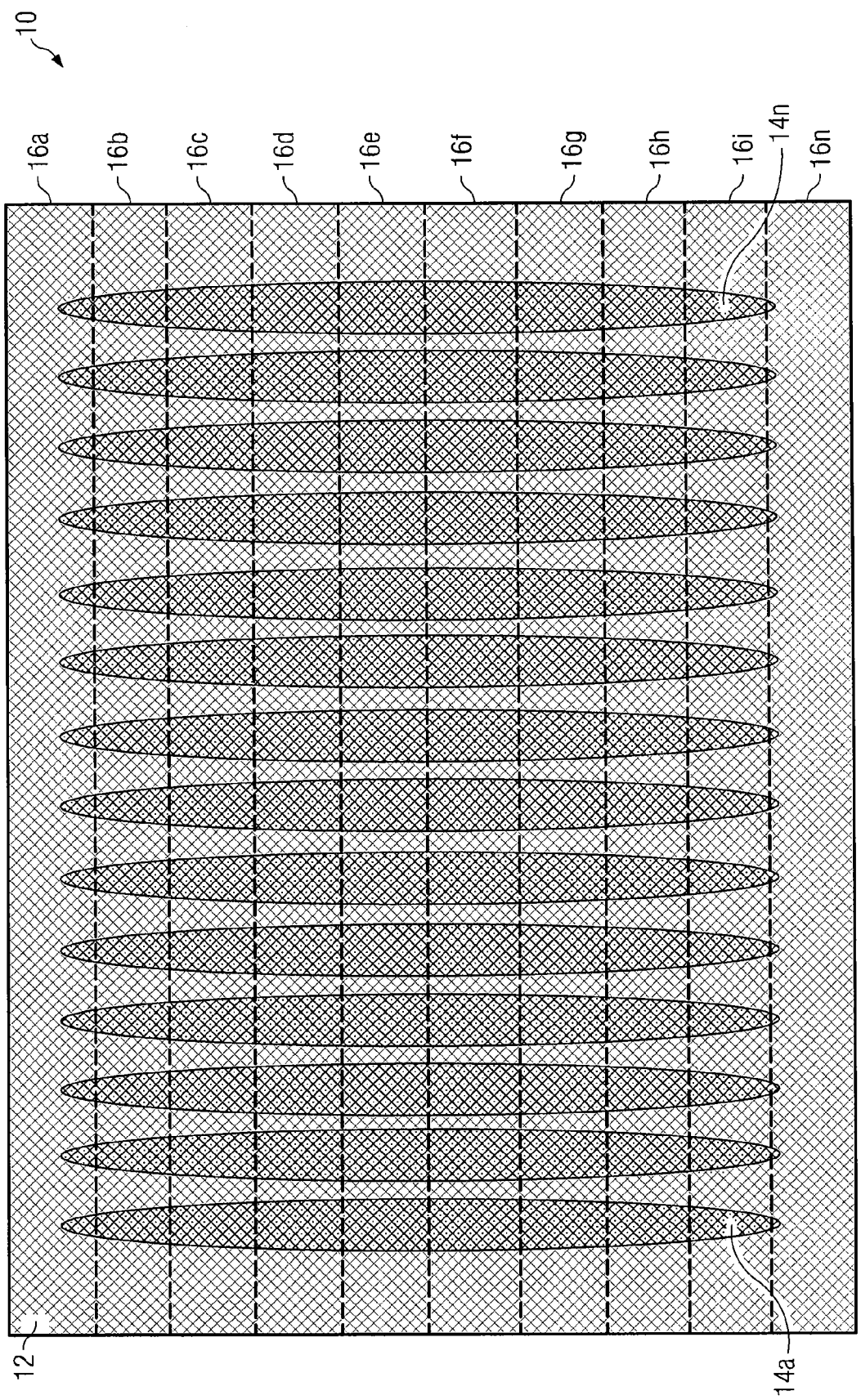
FIG. 4 illustrates yet another example embodiment of a spatial light modulator with a plurality of reset groups.

FIG. 4 illustrates yet another example embodiment of a spatial light modulator 10 with a plurality of reset groups 16. FIG. 4 comprises spatial light modulator 10, micromirrors 12, optical channels 14a-14n, and reset groups 16a-16n. Spatial light modulator 10 comprises a plurality of micromirrors 12 arranged in an array on spatial light modulator 10. Optical channels 14a-14n each reside on a plurality of micromirrors 12. In this embodiment, fourteen optical channels 14a-14n are illustrated. In addition, dotted lines between the reset groups 16a-16n represent the reset boundaries. Reset groups 16 can each comprise any suitable number of micromirrors 12.

In FIG. 4, optical channels 14a-14n are configured into an elliptical shape so that each optical channel 14 can cover a number of reset groups 16. In this embodiment, each optical channel 14 stretches across approximately ten reset groups 16. Each optical channel 14 comprises micromirrors 12 that can be reset at ten different times in some embodiments. In other embodiments, one or more of the reset groups 16 can be reset at the same time, while others are reset at different times.

In some optical systems, optical channels are spread out upon on a spatial light modulator in such a way that the optical channels avoid the boundaries of a reset group. In some spatial light modulators, irregular behavior of the micromirrors may occur under certain conditions at or near the boundaries of the reset groups, so the optical channels are situated to avoid the boundaries. In the embodiments described in the present disclosure, optical channels are distributed across the boundaries of reset groups so that the micromirrors associated with the optical channel can be reset at different times and reduce optical insertion loss.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

The invention claimed is:

1. A system, comprising:
   a spatial light modulator comprising a plurality of modulation elements, the spatial light modulator operable to receive an optical signal comprising two or more spatially separated optical channels, wherein the elements are operable to perform an optical function on at least one of the two or more optical channels;
   two or more reset groups associated with the spatial light modulator, wherein each reset group comprises one or more elements, and wherein at least one of the two or more optical channels resides on at least two of the two or more reset groups; and
   a controller operable to actuate the elements of at least one of the at least two reset groups associated with the optical channel at a different time than any one or more other reset group of the at least two reset groups.

2. The system of claim 1, wherein each of the at least two reset groups are actuated using an electrical control signal.

3. The system of claim 1, wherein the actuation comprises a reset signal, and at least one of the one or more elements is reset to a different modulation state.

4. The system of claim 1, wherein the actuation comprises a reset signal, and at least one of the one or more elements is reset to a same modulation state.

5. The system of claim 1, wherein at least one of the optical channels resides on two reset groups, and wherein the two reset groups are actuated at different times.

6. The system of claim 1, wherein the at least two reset groups associated with the optical channel are actuated at staggered intervals to reduce optical insertion loss.

7. The system of claim 1, wherein at least one of the optical channels resides on three or more reset groups, and wherein at least two of the three or more reset groups are actuated at different times.

8. The system of claim 1, the modulation elements organized in a plurality of rows of elements, wherein each row of elements on the spatial light modulator can be actuated independently of every other row of elements.

9. The system of claim 1, wherein at least two of the two or more reset groups comprise the same number of elements.

10. The system of claim 1, wherein each modulation element comprises a reset group.

11. The system of claim 1, wherein at least one of the optical channels comprises an elliptical shape operable to reside on three or more reset groups.

12. The system of claim 1, wherein at least one of the optical channels resides on a reset boundary between two or more reset groups, and wherein the two or more reset groups at the reset boundary are actuated at different times.

13. The system of claim 1, wherein at least one of the two or more elements comprises a micromirror.

14. The system of claim 1, wherein the optical signal comprises collimated, temporally coherent light.

15. A method, comprising:
receiving two or more spatially dispersed optical channels comprising collimated temporally coherent light at a spatial light modulator, the spatial light modulator operable to receive and transmit data;
performing one or more optical functions on one of the two or more optical channels with a plurality of modulation elements on the spatial light modulator; and
actuating a first reset group and a second reset group of the plurality of modulation elements associated with the optical channel, and wherein the first reset group and the second reset group are actuated at different times.

16. The method of claim 15, wherein at least one of the plurality of elements comprises a micromirror, and wherein actuating a first reset group and a second reset group of the plurality of elements comprises resetting the micromirror to a different modulation state.

17. The method of claim 15, wherein at least one of the plurality of elements comprises a micromirror, and wherein actuating a first reset group and a second reset group of the plurality of elements comprises resetting the micromirror to a same modulation state.

18. The method of claim 15, wherein at least one of the plurality of elements comprises a micromirror, and wherein actuating a first reset group and a second reset group of the plurality of elements comprises resetting at least one micromirror to a different modulation state and at least one other micromirror to a same modulation state.

19. The method of claim 15, wherein actuating the first reset group and the second reset group at different times reduces the change in optical insertion loss.

20. The method of claim 15, wherein each row of elements associated with the optical channel comprises a reset group.

21. The method of claim 15, wherein the first reset group and the second reset group comprise the same number of elements.

22. The method of claim 15, wherein each of the plurality of modulation element comprises a reset group.

23. The method of claim 15, wherein the optical channel resides on at least a third reset group.

24. A method for optical communications, comprising:
receiving, in an optical communications network, two or more spatially dispersed optical channels comprising collimated temporally coherent light, at a spatial light modulator, the spatial light modulator operable to receive and transmit data in the optical communications network;
performing one or more optical functions on one of the two or more optical channels with a plurality of micromirrors on the spatial light modulator;
storing one or more values in a memory associated with each micromirror of the spatial light modulator, the one or more values in the memory operable when loaded to the spatial light modulator to dictate the tilt angle state of at least one of the plurality of micromirrors;
resetting a first reset group and a second reset group of the plurality of micromirrors associated with the optical channel, wherein the first reset group and the second reset group each comprise one or more micromirrors associated with the optical channel, and wherein a time period for resetting the first reset group does not overlap with a time period for resetting the second reset group;
wherein resetting the first reset group and the second reset group comprises loading the values in the memory to the spatial light modulator followed by applying a resetting signal to the micromirrors; and
wherein resetting the first reset group and the second reset group comprises resetting the reset groups at different times.

25. The method of claim 24, wherein the plurality of micromirrors comprise a third reset group associated with the optical channel, the third reset group resetting at a different time than either the first reset group or the second reset group.

* * * * *